May 13, 1941. W. HUPPERT 2,242,074
BARRETTE
Filed June 11, 1940
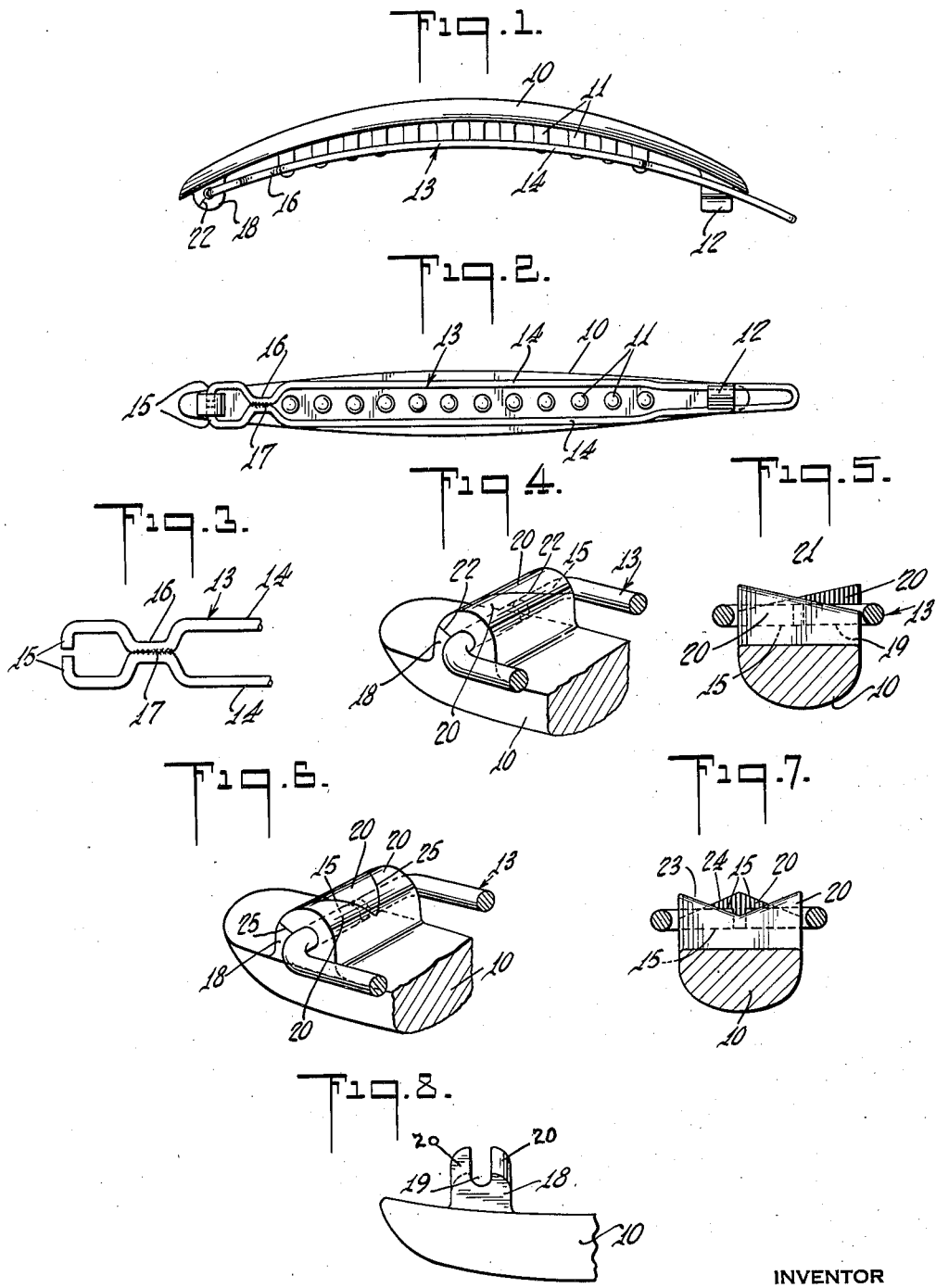
INVENTOR
WILLIAM HUPPERT.
BY
ATTORNEY Patented May 13, 1941

2,242,074

UNITED STATES PATENT OFFICE 2,242,074

BARRETTE

William Huppert, New York, N. Y., assignor to Delamere Company, Inc., a corporation of Delaware Application June 11, 1940, Serial No. 339,852

6 Claims. (Cl. 132—48)

This invention relates to a barrette, and particularly to a barrette of the pivoted tongue type comprising a body member having a lug in which the tongue is hinged.

The tongue is generally made of spring wire bent to form two arms having inturned ends that are sprung into an aperture in the pivot lug. After the tongue has been sprung into place, its arms are secured together adjacent the pivot lug to prevent displacement of the inturned ends. This has been effected by clinching the arms with a band, or by crossing them one over the other and by welding at the place of crossing. In either case the consolidation is performed in a separate operation after the tongue has been inserted in the lug.

An object of the present invention is to provide a lug in which the tongue may be inserted without the necessity of springing it into place.

A characteristic feature of the invention is that it permits of welding or uniting the arms, adjacent the pivot, before the tongue is secured in the lug. This may be done while the tongue is being formed and avoids the necessity of connecting the parts in a separate operation after the tongue has been sprung into place as has heretofore been the practice. Not only does this avoid the objection noted, but it provides a stronger and better construction.

A further object of the invention is to provide a bifurcated lug having parts that are adapted to be bent over the inturned ends of the tongue to form a socket in which the inturned ends are pivotally held, said parts being of such shape that their meeting edges form a joint which is non-coincidental with the pivotal axis of the tongue. Because of the fact that the joint and the axis of the inturned ends do not fall in line with each other, the ends will be held in place in the lug even should the joint open slightly.

The invention is shown, by way of illustration, in the accompanying drawing, in which:

Figure 1 is a side elevation of a barrette embodying the invention;

Fig. 2 is a bottom plan view thereof;

Fig. 3 is a fragmentary plan view of the tongue member;

Fig. 4 is an enlarged perspective view of the pivot lug, with parts of the body member and the tongue broken away;

Fig. 5 is a transverse section through the body showing the walls of the lug before they are bent over;

Figs. 6 and 7 are corresponding views to Figs. 4 and 5 of a modification of the lug construction; and Fig. 8 is a fragmentary side view of the lug before its walls have been bent over.

Having reference now to the drawing, 10 indicates a bar or body member of suitable material, preferably curved lengthwise. The bar as shown has teeth 11, in the manner of a comb-barrette, but the teeth may be omitted. At one end is a catch 12 for latching the tongue 13 in its closed position. These elements are old in the art and may be of any desired form.

The tongue 13 is made of spring wire bent to form two substantially parallel arms 14 having inturned ends 15. At 16, adjacent the inturned ends, the two arms 14 are bent towards and into lateral contact with each other and are welded together along the line of contact 17.

If desired, the inturned ends 15 may also be welded or soldered together, or they may be united with a sleeve. The welding or uniting operations are performed before the tongue is attached to the barrette. Of course, instead of welding the portions 16 of the tongue, they may be connected in any suitable way.

A pivot lug 18 is formed at the other end of the bar 10, preferably integral therewith. The lug has a transverse opening or groove 19 in which the inturned ends 15 are laid, and one or more walls 20, which walls are bent over the inlaid ends and constitute complementary parts of the socket in which the tongue is pivotally held.

As shown, the lug 18 is bifurcated having two spaced walls or branches 29 of substantially the same over-all height, although one may be of lesser height than the other. In the form illustrated in Fig. 5, the upper edges 21 of the parallel walls are inclined in opposite directions so that when the walls are bent or rolled over they form a butt-joint 22 that extends at an angle to the pivotal axis of the tongue, as seen in Fig. 4.

In the modification shown in Fig. 7, the upper edge 23 of one wall is V-shaped and the upper edge 24 of the opposite wall is of complementary inverted V-shape. When these walls are bent or rolled over their meeting edges form a V-shaped butt-joint 25 as shown in Fig. 6.

It is manifest that the upper edges of the walls may be shaped to form a variety of different joints all having the characteristic that the joint is non-coincidental or out of line with the pivotal axis of the tongue. If desired, the parts of the joint may be cemented but this is unnecessary because of the fact that the line of the joint does not coincide with the axis of the inturned ends 15 and consequently the latter would be kept in place by portions of the rolled over walls even if the joint should open somewhat.

It is also to be understood that the walls may be formed in a lap-joint and that other modifications may be made within the scope and spirit of the invention as set forth in the specification and claims.

I claim:

1. In a barrette, a body member, a tongue, and a lug on the body in which the tongue is pivoted, said lug having a portion that overlies the pivoted portion of the tongue and that meets a second portion of the lug along a line of juncture which is out of line with the pivotal axis of the tongue and which is longer than the transverse dimension of the lug.

2. In a barrette, a body member, a tongue, and a lug on the body in which the tongue is pivoted, said lug having oppositely bent portions that overlie the pivoted portion of the tongue and that meet along a line which crosses the pivotal axis of the tongue and which is longer than the transverse dimension of the lug.

3. In a barrette, a body member, a tongue, and a bifurcated lug on the body in which the tongue is inserted and in which it is pivotally held, said lug having walls that overlie the inserted portion of the tongue and that have a line of juncture which crosses the pivotal axis of the tongue.

4. In a barrette, a body member, a tongue, and a lug on the body in which the tongue is pivoted, said lug having opposed bent portions of complementary shape between which the pivotal portion of the tongue is embraced, the meeting edges of said portions extending along a line that is inclined with respect to the pivotal axis of the tongue.

5. In a barrette, a body member, a tongue, and a lug on the body in which the tongue is pivoted, said lug having opposed bent portions of complementary shape between which the pivotal portion of the tongue is embraced, the meeting edges of said portions extending along a substantially V-shaped line.

6. In a barrette, a body member, a tongue, and a lug on the body in which the tongue is pivoted, said tongue formed of wire having two substantially parallel arms that are laterally united adjacent the pivoted end, said lug having portions that overlie the pivoted portion of the tongue and that meet along a line which crosses the pivotal axis of the tongue.

WILLIAM HUPPERT.